United States Patent [19]
Bates et al.

[11] Patent Number: 5,874,961
[45] Date of Patent: Feb. 23, 1999

[54] SCROLL BAR AMPLIFICATION APPARATUS AND METHOD

[75] Inventors: Cary Lee Bates; Paul Reuben Day, both of Rochester, Minn.

[73] Assignee: International Business Machines Corporation, Armonk, N.Y.

[21] Appl. No.: 820,798

[22] Filed: Mar. 19, 1997

[51] Int. Cl.[6] .................................................. G06F 3/00
[52] U.S. Cl. ............................................................ 345/341
[58] Field of Search .......................................... 345/341

[56] References Cited

U.S. PATENT DOCUMENTS

| | | | |
|---|---|---|---|
| 5,196,838 | 3/1993 | Meier et al. | 345/118 |
| 5,313,229 | 5/1994 | Gilligan et al. | 345/157 |
| 5,339,391 | 8/1994 | Wroblewski et al. | 345/341 |
| 5,371,846 | 12/1994 | Bates | 345/341 |
| 5,374,942 | 12/1994 | Gilligan et al. | 345/157 |
| 5,473,344 | 12/1995 | Baco et al. | 345/163 |
| 5,526,480 | 6/1996 | Gibson | 345/302 |
| 5,530,455 | 6/1996 | Gillick et al. | 345/163 |
| 5,553,225 | 9/1996 | Perry | 345/341 |
| 5,633,657 | 5/1997 | Falcon | 345/145 |

OTHER PUBLICATIONS

Delrina 7.0 Winfax Pro Getting Started Guide, Getting Started Basics, Apr. 1996, pp. 5–11.

IBM Technical Disclosure Bulletin, vol. 37, No. 08, Aug. 1994, "New Common User Access Control: Pushpad for Greater Mouse Productivity," pp. 497–499.

IBM Technical Disclosure Bulletin, vol. 38, No. 01, Jan. 1995, "Speed–Sensitive Scroll Widgets," pp. 483–484.

*Primary Examiner*—A. Katbab
*Attorney, Agent, or Firm*—Andrew J. Dillon

[57] ABSTRACT

Provided is an apparatus and method for a secondary scroll bar that yields increased granularity in scrolling through a viewable object, such as a document displayed within a window of a graphical user interface of a computer system. Initially, an icon is displayed within the graphical user interface which, when activated by a user, provides this secondary scroll bar. Next, the secondary scroll bar is displayed within the window in response to a selection of the icon by a user, wherein the secondary scroll bar allows a user to scroll through a narrowly defined region of the viewable object, in response to activation of the icon. Delimiter marks are also displayed within a primary scroll bar upon which the secondary scroll bar is dependent, in response to the selection by the user of the secondary scroll bar. The delimiter marks indicate a searchable range of the viewable object by the secondary scroll bar. Thereafter, the user can scroll through the narrowly defined region of the viewable object by utilizing the secondary scroll bar. Additionally, multiple additional scroll bars can be activated by the user to provide increased granularity on multiple levels when scrolling through the viewable object.

24 Claims, 12 Drawing Sheets

ICON MECHANISM

SCROLL BAR AMPLIFICATION APPARATUS AND METHOD

BACKGROUND OF THE INVENTION

1. Technical Field

The present invention relates in general to an improved graphical user interface apparatus. In particular, the present invention relates to an improved graphical user interface apparatus.

2. Description of the Related Art

A graphical user interface is a type of display format which enables a user to choose commands, start programs, and see lists of files and other options by pointing to pictorial representations and lists of menu items on a computer display screen. Choices can generally be activated by either a keyboard or a pointing device such as a mouse. A mouse is a commonly utilized pointing device, containing one or more buttons, that allows a user to interact with a product or operating environment such as a graphical user interface.

Some conventional graphical user interfaces provide a cursor and scroll bar for scrolling through portions of a viewable object. A viewable object can contain multiple components such as spreadsheets, text, hotlinks, pictures, sound, and video object. However, a viewable object is not limited to these components. In many types of graphical user interfaces, a vertical or horizontal bar at the side of bottom of a graphical user interface window can be utilized in conjunction with a pointing device such as a mouse, trackball, or stylus to move about in a viewable object. Scrolling permits viewing of any desired portion of a viewable object and is so named because it is the electronic equivalent of reading through a rolled (i.e., scrolled) viewable object rather than flipping through pages of a book. A vertical scroll bar is usually utilized to control up and down movement (e.g., through lines and pages of a viewable object), while a horizontal scroll bar controls movement across a viewable object.

Conventional scroll bar systems commonly include two arrows and a slider. Each arrow controls which direction a user desires to scroll through a viewable object. An arrow conventionally controls movement through a viewable object in small increments or small blocks of information, such as individual lines or a page of a viewable object, for example. Moreover, if an arrow points in the upward direction, the viewable object can be scrolled from its present position toward the first page of the viewable object. If an arrow points in the downward position, the viewable object can be scrolled from its present position toward the last page of the viewable object.

A slider is typically utilized to control movement through a viewable object in larger increments than when the arrows are utilized. Instead of incrementing by small blocks of information, the slider typically controls movement through a viewable object in larger blocks, increments, or groups of information, such as two or more pages, for example. Therefore, when a user desires to go from the first page to the fiftieth page, the slider is usually selected and moved until page fifty is selected. The term "elevator" is particularly used sometimes to describe a slider that operates on a vertical scroll bar. The term "puck" is also used to describe a slider that operates on the horizontal scroll bar.

When a very large viewable object, such as a large list of items, is accessed by a user via a graphical user interface, the scroll bar slider often represents only a very small portion of the viewable object. When the slider is grabbed and moved by the user utilizing a pointing device such as a mouse, the viewable object scrolls too quickly, even for small movements of the slider, making it difficult for the user to locate a desired section of the viewable object. Even expert mouse users, for instance, can become frustrated when attempting to utilize today's sliders on large viewable objects. The problem is even more acute for less-adept users.

An additional problem faced by users attempting to access large viewable objects in this manner is the difficulty encountered when utilizing markers positioned within the scroll bar. As their name suggests, markers are positioned within the scroll bar to identify a particular location. When a user utilizes a pointing device at one of these markers, the viewable object shifts to a particular region within the viewable object associated with the marker. Such markers, however, do present problems. For example, in a large viewable object, these markers are often positioned so close to one another, that a user may not realize that there are, in fact, multiple markers available. Also, if these markers are proportional to the size of the region, they can be too small to provide any useful information to the user.

Current solutions to the problems associated accessing large viewable objects typically provide an index bar from which the user may select an area of the viewable object to search. However, such solutions do not provide fluid scanning of the viewable object. An index bar, for example, merely allows a user to jump to a particular region of the viewable object without reference to a previous region. Index bars do not allow a user to scroll to a desired region of a viewable object and thereafter focus a search at multiple levels within the desired region.

With respect to the foregoing needs, the inventors are aware of no attempts to date which have been directed toward satisfying the foregoing identified needs. A need also exists for an apparatus and method that allows a user to tailor a search toward particular region of the viewable object, while providing for fluid scanning of the viewable object. Thus, it is apparent that a need exists for an apparatus and method that provides access to a particular region of a viewable object.

SUMMARY OF THE INVENTION

It is therefore one object of the present invention to provide for an improved graphical user interface apparatus and method.

It is therefore another object of the present invention to provide an improved graphical user interface apparatus and method having a cursor, scroll bar, and slider.

It is another object of the present invention to provide an improved graphical user interface apparatus and method having a cursor, scroll bar, and slider, and which provides a secondary scroll bar that maps to a small portion of a viewable object, making it easier for a user to scroll through the viewable object.

The above and other objects are achieved as is now described. An apparatus and method for a secondary scroll bar that yields increased granularity in scrolling through a viewable object, such as a document displayed within a window of a graphical user interface of a computer system. Initially, an icon is displayed within the graphical user interface which, when activated by a user, provides this secondary scroll bar. Next, the secondary scroll bar is displayed within the window in response to a selection of the icon by a user, wherein the secondary scroll bar allows a user to scroll through a narrowly defined region of the viewable object, in response to activation of the icon. Delimiter marks are also displayed within a primary scroll bar upon which the secondary scroll bar is dependent, in response to the selection by the user of the secondary scroll bar. The delimiter marks indicate a searchable range of the viewable object by the secondary scroll bar. Thereafter, the user can scroll through the narrowly defined region of the viewable object by utilizing the secondary scroll bar. Additionally, multiple additional scroll bars can be activated by the user to provide increased granularity on multiple levels when scrolling through the viewable object.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
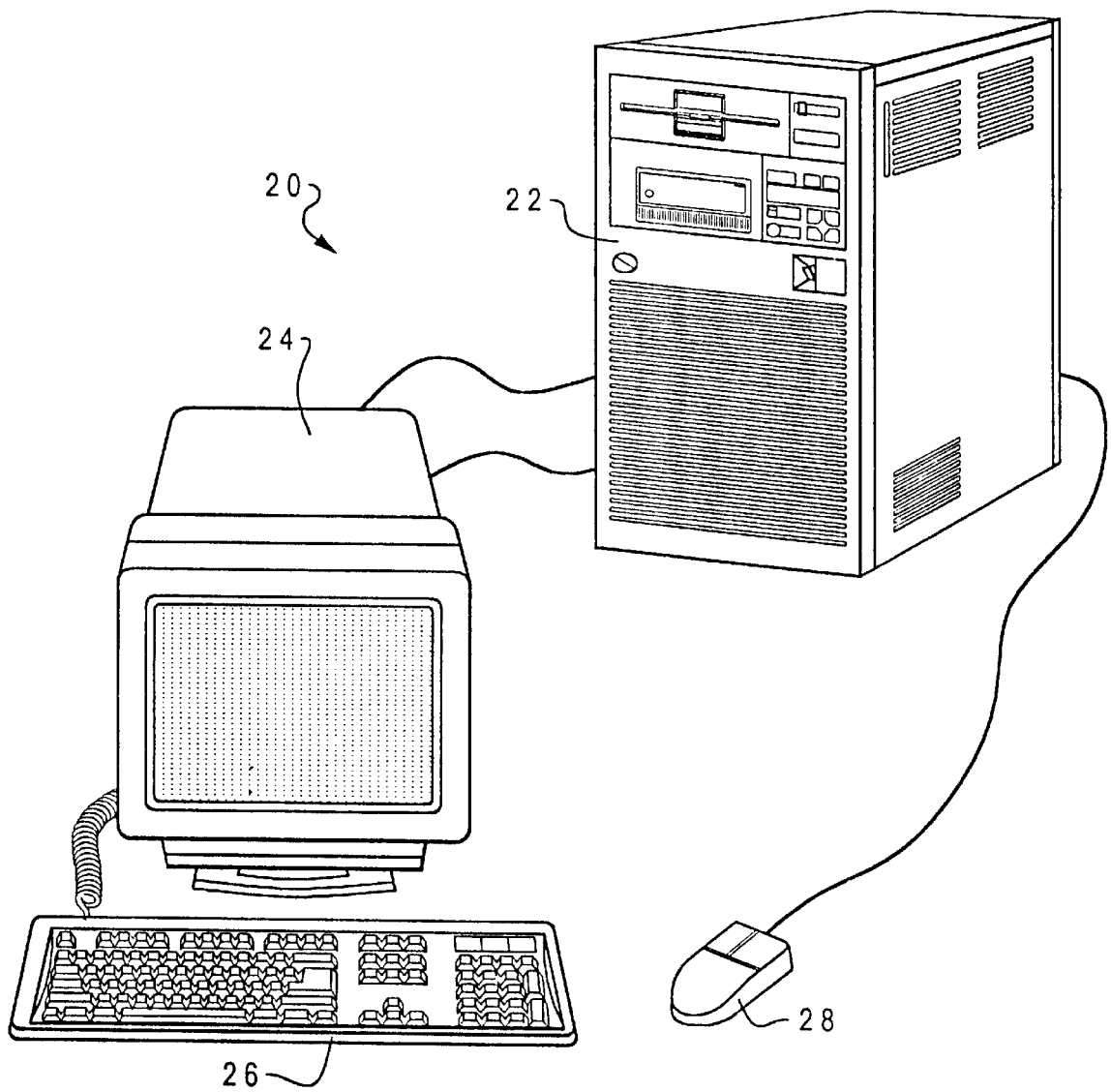
FIG. 1 illustrates a pictorial representation of a computer system in accordance with the preferred embodiment.

With reference now to the figures and in particular with reference to FIG. 1, there is depicted a pictorial representation of a computer system in accordance with the preferred embodiment. A computer system 20 is depicted that includes a system unit 22, a video display terminal 24, a keyboard 26, and a mouse 28. Computer system 20 can be implemented utilizing any suitable computer such as the AS/400 computer system or IBM "Aptiva" computer, both products of International Business Machines Corporation, located in Armonk, N.Y. However, those skilled in the art will appreciate that the mechanisms and apparatus of the present invention apply equally to any computer system, regardless of whether the computer system is a complicated multi-user computing apparatus or a single-user workstation.

Figure 2:
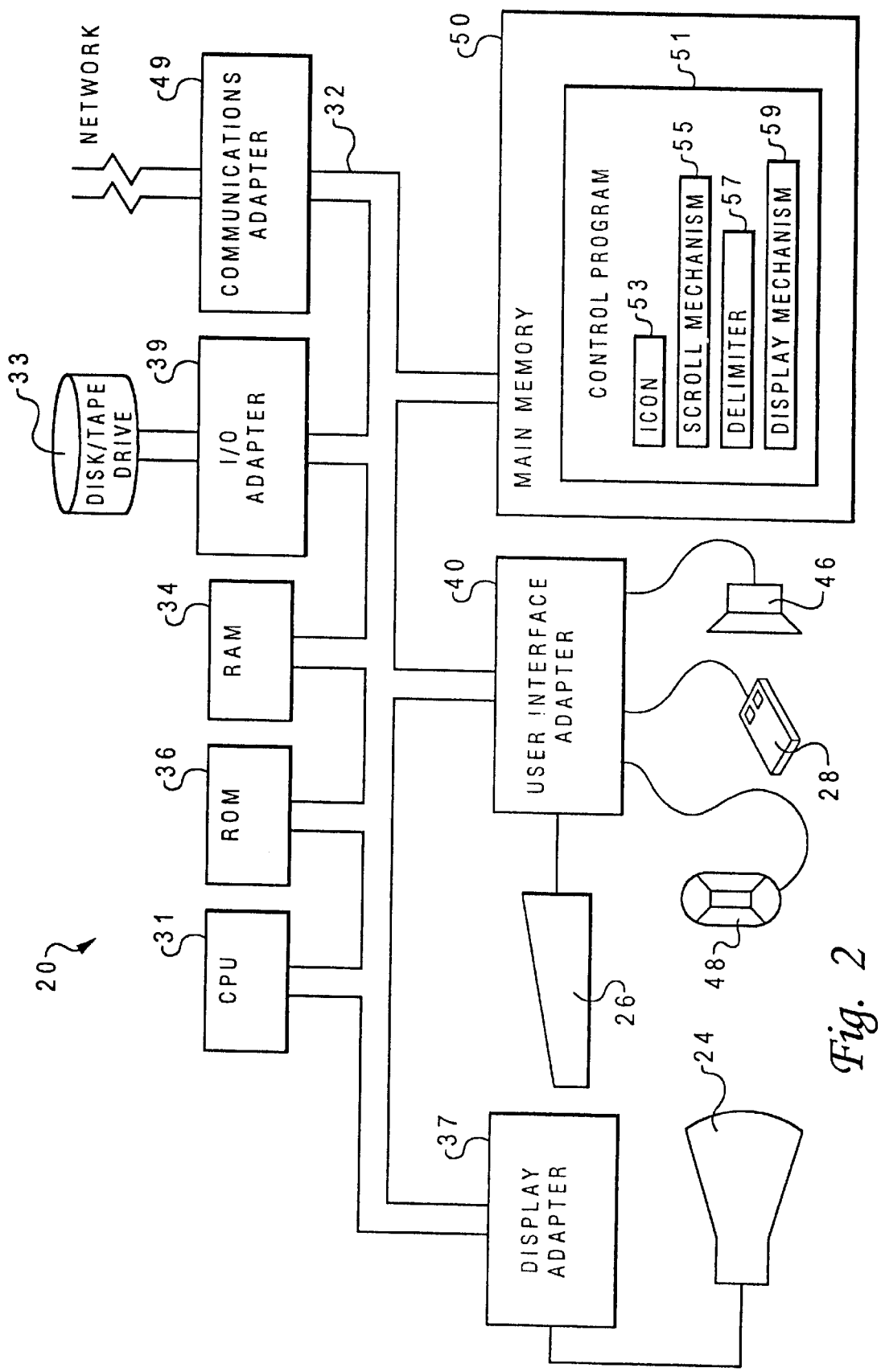
FIG. 2 depicts a representative hardware environment of the computer system of the preferred embodiment.

FIG. 2 depicts a representative hardware environment of the computer system of the preferred embodiment. System unit 22 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display terminal 24, and I/O adapter 39 for connecting peripheral devices (e.g.,, disk and tape drives 33) to system bus 32. Video display terminal 24 is the visual output of computer system 20. Video display terminal 24 can be, for example, a CRT-based video display well-known in the art of computer hardware. However, with a portable or notebook-based computer, video display terminal 24 can be replaced with an LCD-based or a gas plasma-based flat-panel display. Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes an interface such as a graphical user interface that resides within a machine-readable media to direct the operation of computer system 20. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. Other technologies can also be utilized in conjunction with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51. Control program 51 resides within main memory 50 and contains instructions that when executed on CPU 31 carry out the operations depicted in the logic flow chart of FIG. 6 described herein. The computer program product can also be referred to as a program product. Control program 51 is further shown to contain icon mechanism 53, scroll mechanism 55, delimiter 57, and display mechanism 59, that are each described in greater detail in the text associated with FIGS. 7, 8, 9, 10, and 11.

It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution. Examples of signal-bearing media include: recordable-type media, such as floppy disks, hard disk drives and CD ROMs, and transmission-type media such as digital and analog communication links.

Figure 3:
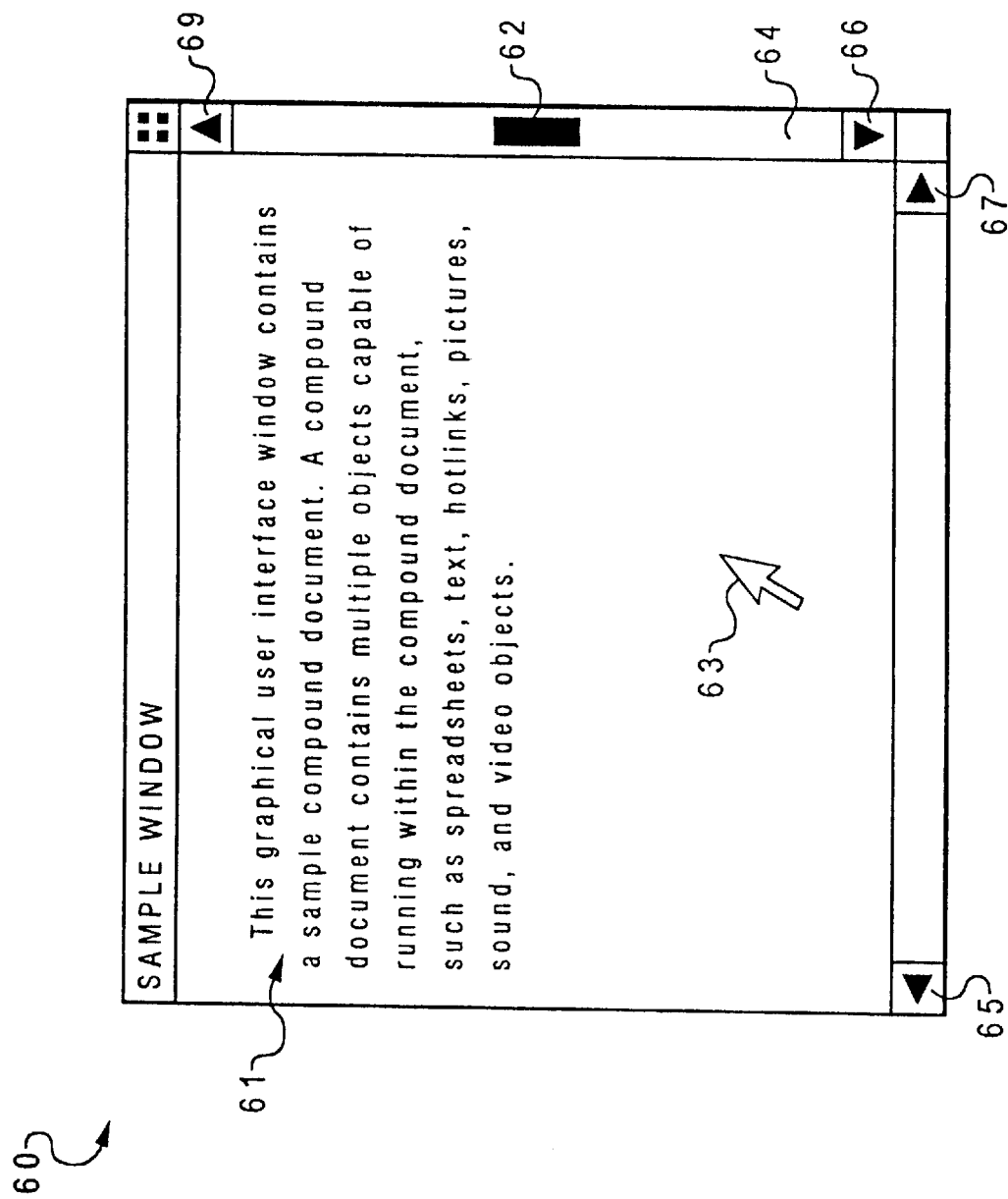
FIG. 3 illustrates a pictorial representation of a graphical user interface window in accordance with the apparatus and method of the present invention.
Figure 4:
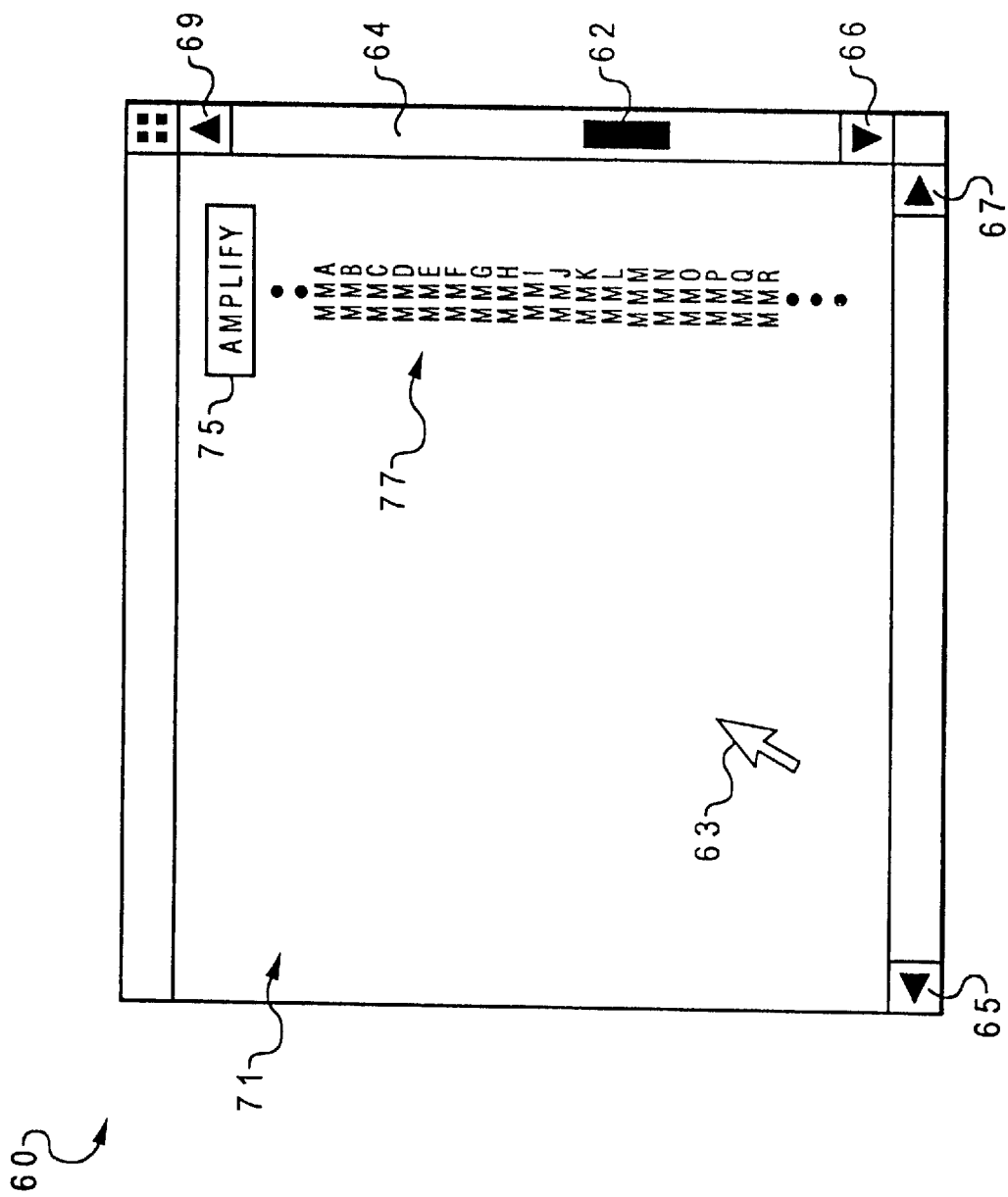
FIG. 4 depicts a pictorial view of a graphical user interface window having an amplification icon in accordance with the preferred embodiment.
Figure 5:
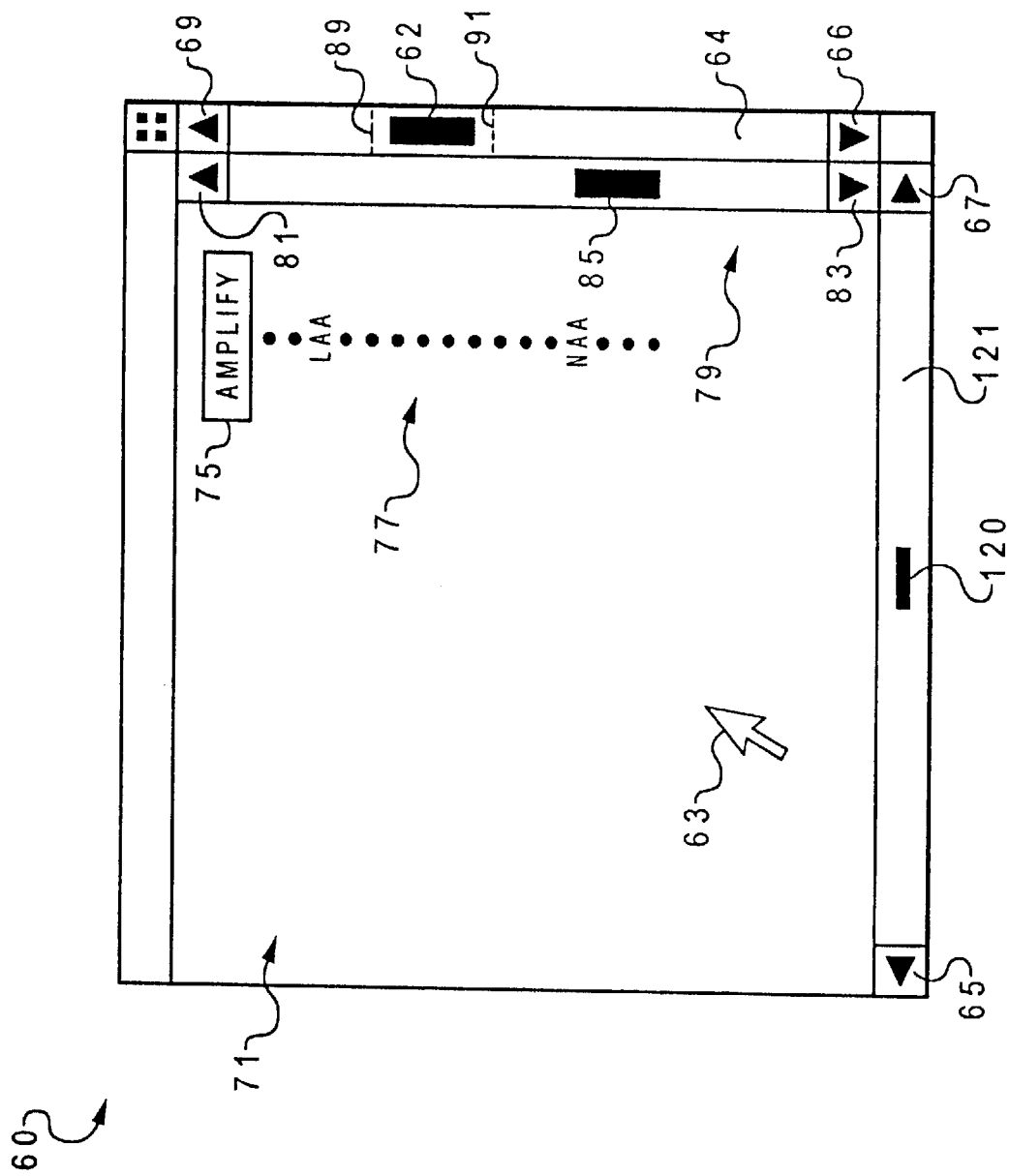
FIG. 5 illustrates a pictorial view of a graphical user interface window and a secondary scroll bar utilized in accordance with the preferred embodiment.

In FIGS. 3, 4, and 5, like parts are indicated by like numbers. FIG. 3 illustrates a pictorial representation of a graphical user interface window 60 in accordance with the apparatus and method of the present invention. Window 60 displays a portion of a viewable object, such as a document 61. Document 61 is a viewable object that contains multiple components, such as spreadsheets, text, hotlinks, pictures, sound, and video objects. The size and position of slider 62 within scroll bar 64 corresponds to the size and position of the current viewable page in relation to document 61. The current viewable page is contained within a viewable window area within window 60.

Because document 61 includes too many pages to view simultaneously, the user can position a mouse cursor 63 over up-arrow 69 or down-arrow section 66 of scroll bar 64 and click a pointing device (e.g., a mouse) to scroll the document upward or downward, as appropriate. Scrolling in this manner permits viewing of any desired portion of document 61. Scrolling is the electronic equivalent of reading through a rolled (i.e., "scrolled") document rather than flipping through pages of a book. Arrows 65 and 67 can also be utilized by a graphical user interface user to scroll left or right through document 61. Scroll bar 64 is thus a graphical user interface window component, associated with a scrollable area, that indicates to a user that more information is available or can be added in a particular direction and can be scrolled into view.

In FIG. 3, the graphical user interface window 60 sizes slider 62 within scroll bar 64 according to the number of pages in document 61. The length of slider 62 is small with respect to the length of scroll bar 64 because it represents one of many pages of document 61. Similarly, the graphical user interface positions slider 62 within scroll bar 64 relative to the viewable position of document 61. For example, the graphical user interface positions slider 62 at the top of scroll bar 64 when the user is viewing the first page of document 61, and at the bottom of scroll bar 64 when the user is viewing the last page of document 61. Slider 62 on scroll bar 64 is defined to have a minimum size.

FIG. 4 depicts a pictorial view of a graphical user interface window 60 having an amplification icon 75 in accordance with the preferred embodiment. Document 71, a viewable object, includes an alphabetical list 77. Slider 62 is located within scroll bar 64 such that slider 62 corresponds to the location of word MMM within alphabetical list 77 of document 71. If the user desires to find another word, such as MBB, the chances are high that, in utilizing a conventional slider such as slider 62, the user will slide past the desired word MBB due to the cumbersome nature of slider 62. To rectify this problem, the user can click on, utilizing a mouse or other pointing device, an amplification button represented by "amplify" icon 75. Clicking on "amplify" icon 75 provides a secondary scroll bar (i.e., not shown in FIG. 4).

FIG. 5 illustrates a pictorial view of a graphical user interface window 60 and a secondary scroll bar 79 in accordance with the preferred embodiment. Secondary scroll bar 79 includes an up-arrow section 81, a down-arrow section 83, and a slider 85. Thus, the pictorial view of graphical user interface window 60 represents a time later than that depicted in FIG. 5. Clicking on the "amplify" icon 75 provides secondary scroll bar 79. Secondary scroll bar 79 is located within window 60 and covers the words LAA to NAA in alphabetic list 77. The original or primary scroll bar, scroll bar 64, now contains dotted lines 89 and 91 to indicate the area covered by the new secondary scroll bar 79. If secondary scroll bar 79 continues to cover too large of a desired area of document 71 and alphabetic list 77, another click on the "amplify" icon (i.e., or click of a mouse button) produces a third scroll bar with even more granularity, and so on for "n" number of scroll bars.

Although not depicted in FIG. 3 or FIG. 4, a horizontal scroll bar 121 is depicted in FIG. 5 located within window 60. Scroll bar 121 includes a slider 121. An additional "amplify" icon dedicated to scroll bar 121, which is not depicted in FIG. 5, can likewise be utilized in conjunction with the preferred embodiment of the present invention. This second "amplify" icon can allow a user to focus on a specific area of document 71 in the same manner as scroll bar 64, albeit in a horizontal direction instead of a vertical direction. Secondary scroll bar 79 is thus utilized in association with primary scroll bar 64 displayed within a graphical user interface. Both primary scroll bar 64 and secondary scroll bar 79 operate in a first axis. In example depicted in FIG. 5, primary scroll bar 64 and secondary scroll 79 specifically operate along a vertical axis (i.e. scrolling up or down a viewable object). Primary scroll bar 64 has a specified granularity. Thus, in response to an activation of secondary scroll bar 79, secondary scroll bar 79 increases granularity to a finer granularity than the specified granularity of primary scroll bar 64 while scrolling through a viewable object such as document 71.

To back out of a secondary scroll bar such as secondary scroll bar 79, there are several options available. Although the options described herein are directed toward an illustrative embodiment of the present invention, it is contemplated that numerous other options for backing out of a secondary scroll bar can be utilized in accordance with the system and method of the illustrative embodiment of the present invention. If the new secondary scroll bar such as secondary scroll bar 79 is created by clicking on an icon such as "amplify" icon 75, then a "click" utilizing a mouse pointer or other pointing device on the previous scroll bar can close the secondary scroll bar. An additional icon labeled "close" which is not shown in the aforementioned figures, can also be located beside the "amplify" icon or at another appropriate position within window 60.

A "click," utilizing a mouse pointer or other pointing device on the "close" icon, can also close the secondary scroll bar or previous scroll bar in a multiple layering of such scroll bars. Another option to back out of a secondary scroll bar is, if the secondary scroll bar was created as a result of a mouse click, to remove all secondary scroll bars when the slider is "dropped" on the last secondary scroll bar displayed in a multiple layering of such scroll bars. That is, when the user has scrolled through the desired area of the document and the user has moved the slider to the bottom of the secondary scroll bar, the secondary scroll bar will vanish because the user is finished utilizing it.

An additional option for backing out of a secondary scroll bar, in addition to those previously mentioned, includes an option to remove the secondary scroll bar from display when the user quits dragging the slider maintained within a secondary scroll bar. In such a case, as soon as the user quits dragging this "secondary" slider, the secondary scroll bar vanishes from view. It is contemplated that such options will only be utilized with particular embodiments and are not necessary limitations of the preferred embodiment of the present invention. Thus, other options for backing out of a secondary scroll bar, not described herein, can also be utilized in accordance with the preferred embodiment of the present invention.

The original scroll bar 64 allows a user to scroll through the entire document 71 contained within the window 60. Delimiter marks 89 and 91 indicate the range of document 71 covered by secondary scroll bar 79. Delimiter marks 89 and 91 are indicative of a searchable range of document 71. If the user, for example, activates up arrow 81 on secondary scroll bar 79, the user can scroll at a maximum upward range, to a region or area of document 79 that is located 5% upward from the location of cursor 63. Likewise, if the user activates down arrow 83 on secondary scroll bar 79, the user can scroll at a maximum downward range, to a region or area of document 79 that is located 5% downward from the location of cursor 63. The total area of document 79 over which a user may scroll is thus 10% of the area covered by scroll bar 64 and centered about the relative area of document 79 corresponding to slider 62. This 10% area can be altered however, by placing cursor pointer 63 with a mouse or other pointing device over dotted line 89 or 91, clicking either of the dotted lines, and dragging the chosen dotted line away from slider 62. Thus, the default range of 10% can be increased or decreased depending upon which direction the dotted lines are dragged, up or down through scroll bar 64.

Figure 6:
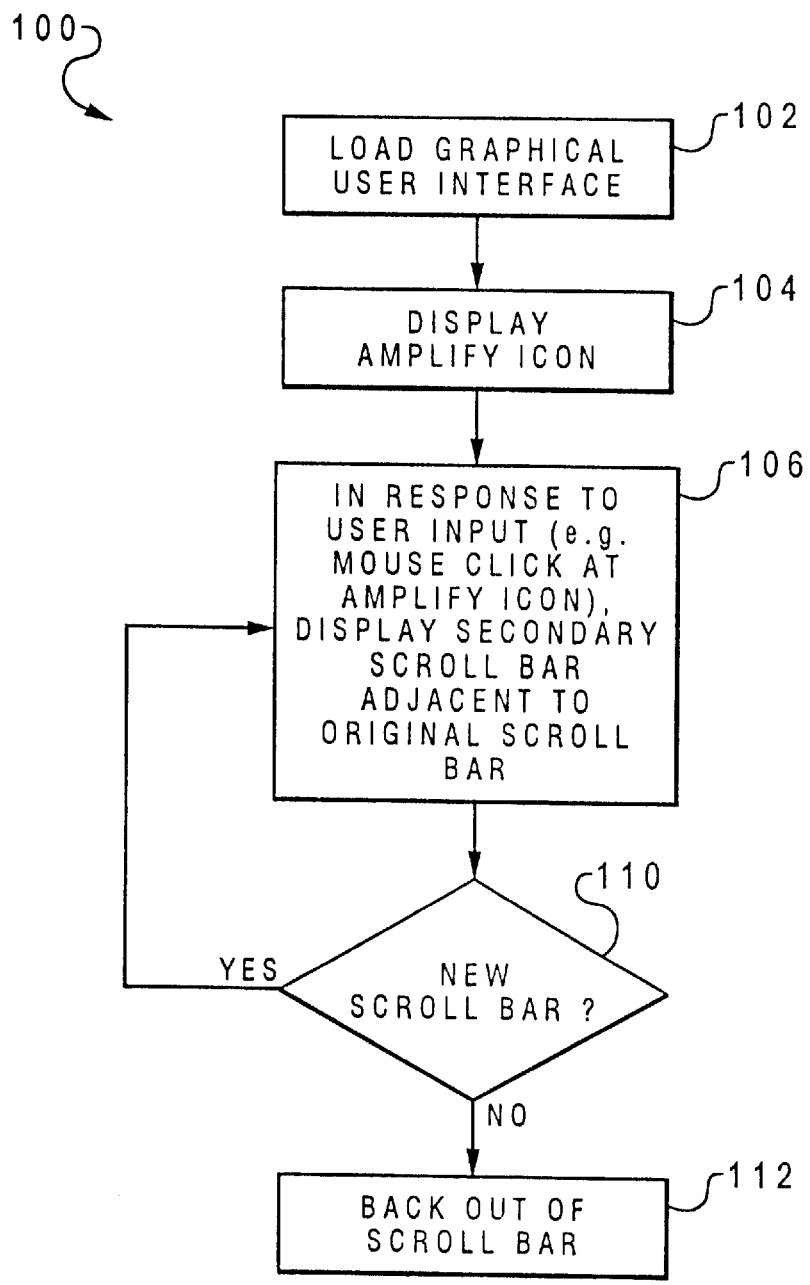
FIG. 6 is a flow diagram that shows steps utilized to carry out the scroll bar amplification method of the present invention, according to the preferred embodiment.

FIG. 6 is a flow diagram 100 that shows steps utilized to carry out the scroll bar amplification method of the present invention, according to the preferred embodiment. As depicted at block 102, an interface such as a graphical user interface is initially loaded from memory into a computer system. As illustrated at block 104, the aforementioned "amplify" icon is displayed for utilization by the user via the graphical user interface. The "amplify" icon allows a user to choose a secondary scroll bar. As described at block 106, in response to user input, the secondary scroll bar is displayed within a window such as window 60 of FIG. 5 The secondary scroll bar is located within the window and positioned next to the original scroll bar. User input includes "clicking" the "amplify" icon utilizing a mouse or other pointing device. Although not a necessary limitation of preferred invention, the secondary scroll bar can also be activated and displayed by using a mouse or other pointing device to double click the original slider located within the original scroll bar. As illustrated at block 110, a decision is made whether or not to choose a new scroll bar, in addition to the secondary scroll bar already displayed, as depicted at block 106. If the answer is yes, the operations described in block 106 are repeated. If the answer is no, as depicted at block 112, the user can back out of the secondary scroll bar according to one of the options for backing out of a secondary scroll bar described earlier.

Figure 7:
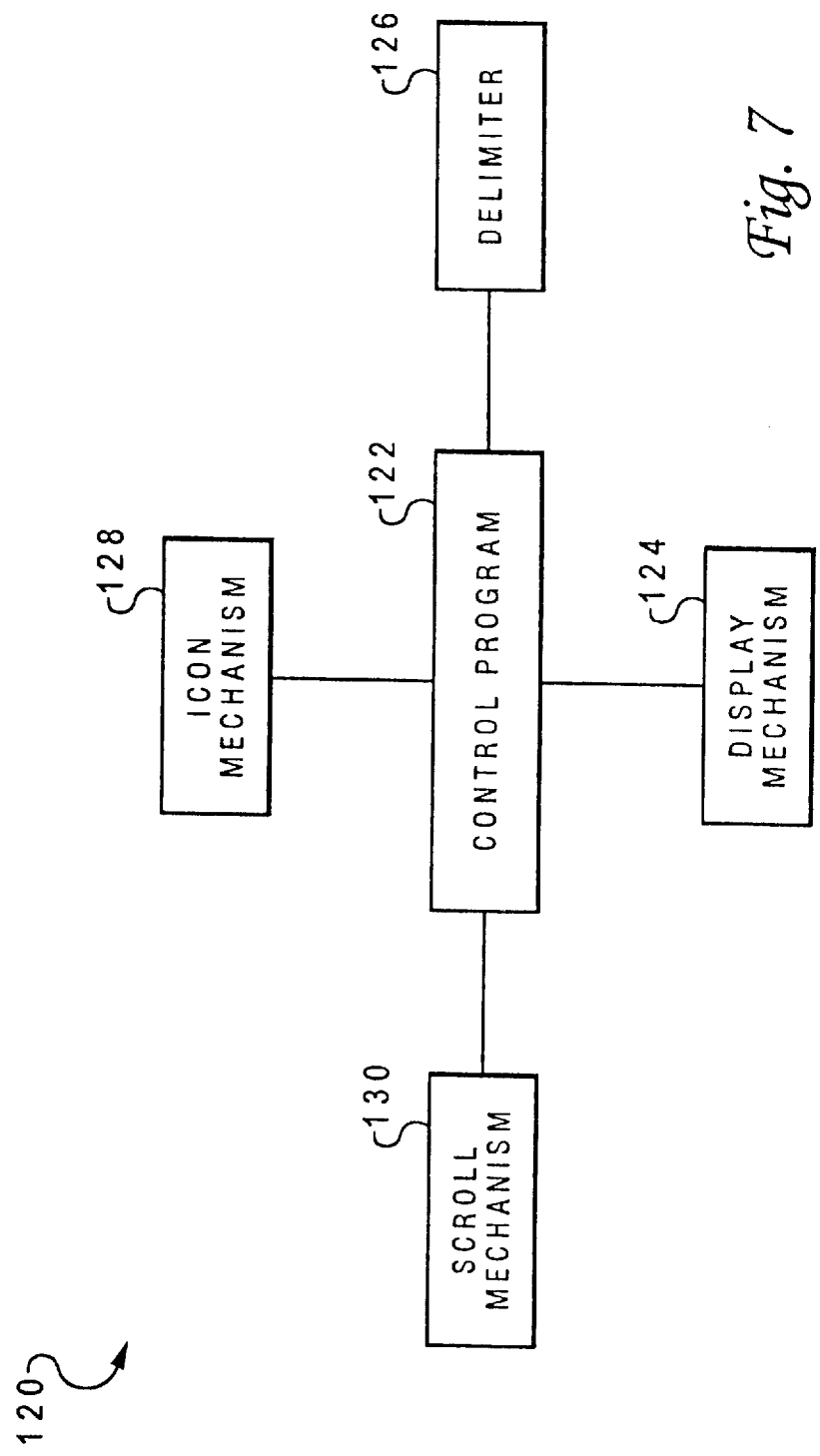
FIG. 7 illustrates a block diagram of a scroll bar amplification apparatus that is utilized in the preferred embodiment.

FIG. 7 illustrates a block diagram of a scroll bar amplification system 120 in accordance with the preferred embodiment FIG. 7 depicts a control program 122 to which are connected a scroll mechanism 130, a delimiter 126, an icon mechanism 128, and a display mechanism 124. The system depicted in FIG. 7 implements the method depicted in FIG. 6. The system is composed of multiple mechanisms which reside within a computer memory as main memory 50 depicted in FIG. 2 and are executed on a computer processor such as CPU 31 depicted in FIG. 2. The system for implementing a secondary scroll bar provides increased granularity in scrolling through a viewable object such as a document (e.g., word-processing document, spreadsheet, graphics document, etc.) displayed within a window of a graphical user interface.

FIG. 7 specifically depicts representative components of scroll bar amplification system 120. The components depicted in FIG. 7 reside within control program 51 as illustrated in FIG. 2. Icon mechanism 128 is a component of scroll bar amplification system 120 for displaying within a graphical user interface, an icon which, when selected by a user, provides an increased granularity scrolling mechanism, such as the secondary scroll bar described herein. Display mechanism 124 is a component of scroll bar amplification system 120 for displaying the secondary scroll bar within the aforementioned window in response to a selection of the icon by a user, such that the secondary scroll bar allows a user to scroll through a narrowly defined region of a viewable object such as a document, in response to the selection of the icon.

Delimiter 126 is a component of scroll bar amplification system 120 for providing delimiter marks indicative of a searchable range of the viewable object by the secondary scroll bar, such that the delimiter marks are displayed within the original or first scroll bar, also in response to the selection of the icon. Scroll mechanism 130 is a component of scroll bar amplification system 120 that allows a user to scroll though the narrowly defined region of the viewable object, in response to user input within the secondary scroll bar.

Figure 8:
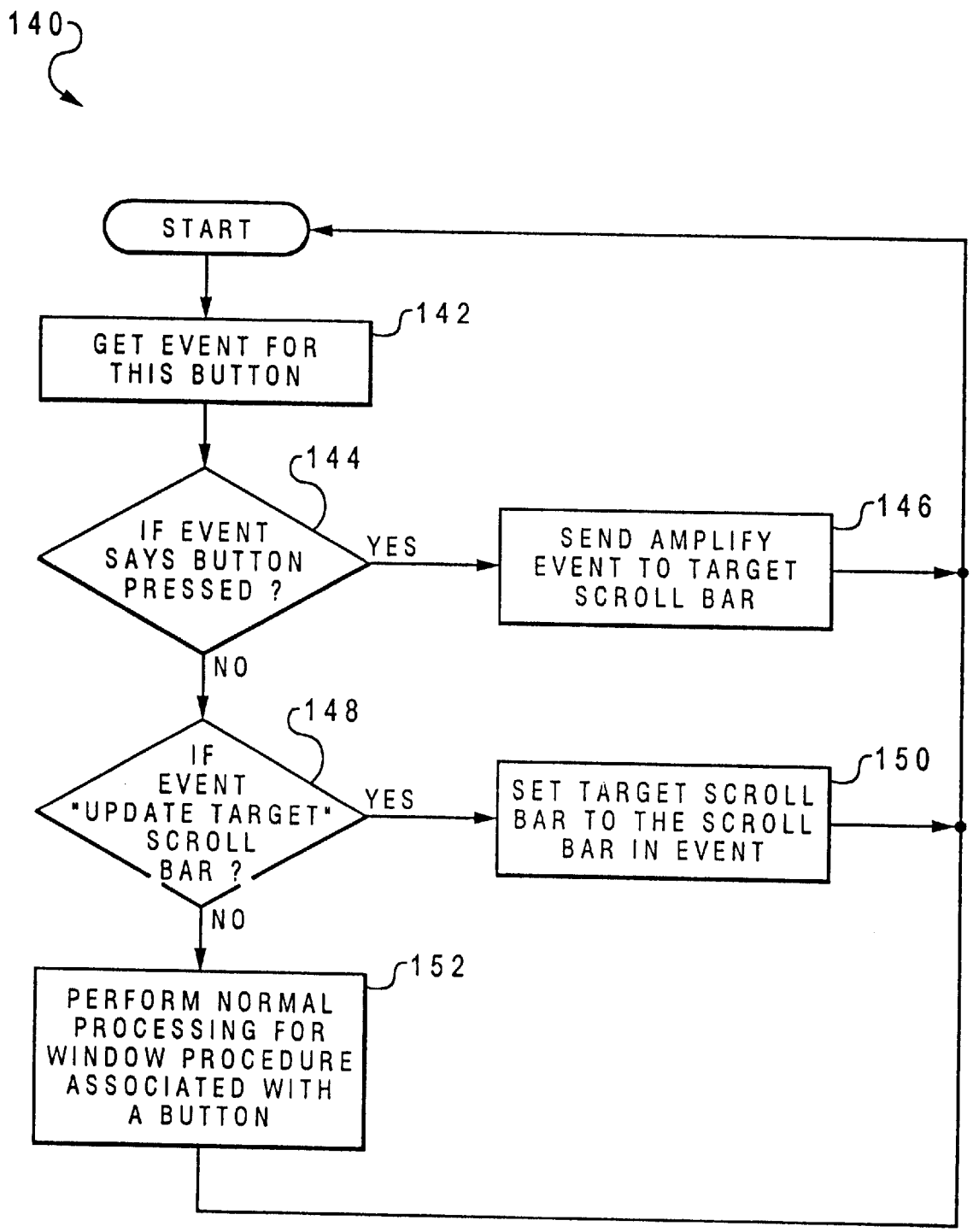
FIG. 8 depicts a flow diagram that shows steps utilized to implement an icon mechanism, according to the preferred embodiment.

FIG. 8 depicts a flow diagram 140 that shows steps utilized to implement an icon mechanism, according to the preferred embodiment of the present invention. FIG. 8 depicts steps implementing the icon mechanism depicted in FIG. 7. The icon mechanism controls an icon located within the graphical user interface such that the icon provides an increased granularity scrolling mechanism in response to a user selection thereof. As illustrated at block 142, a graphical user interface event is triggered when a button is pressed. An event, in the context of a graphical user interface, is an occurrence of significance to a task. For example, user input derived from computer keyboard data-entry keys or pointing devices can trigger events such as scrolling, saving a particular file, and so forth.

As described at block 144, a decision is made whether or not a button-pressing event has occurred. If so, then, as depicted at block 146, an amplify event is sent to a target scroll bar. The target scroll bar, assuming that no amplify events have occurred previously, is equivalent to the original scroll bar displayed within the graphical user interface. If, as depicted at block 144, a decision is made indicating that a button-pressing event has not occurred, then, as depicted at block 148, a decision is made as to whether or not an "update target" scroll-bar event has occurred. If such an event has occurred, then, as indicated at block 160, the target scroll bar is made equivalent to the current scroll bar (i.e., original or secondary). If an "update-target" event has not occurred, then, as depicted at block 152, the graphical user interface continues to perform normally.

Figure 9:
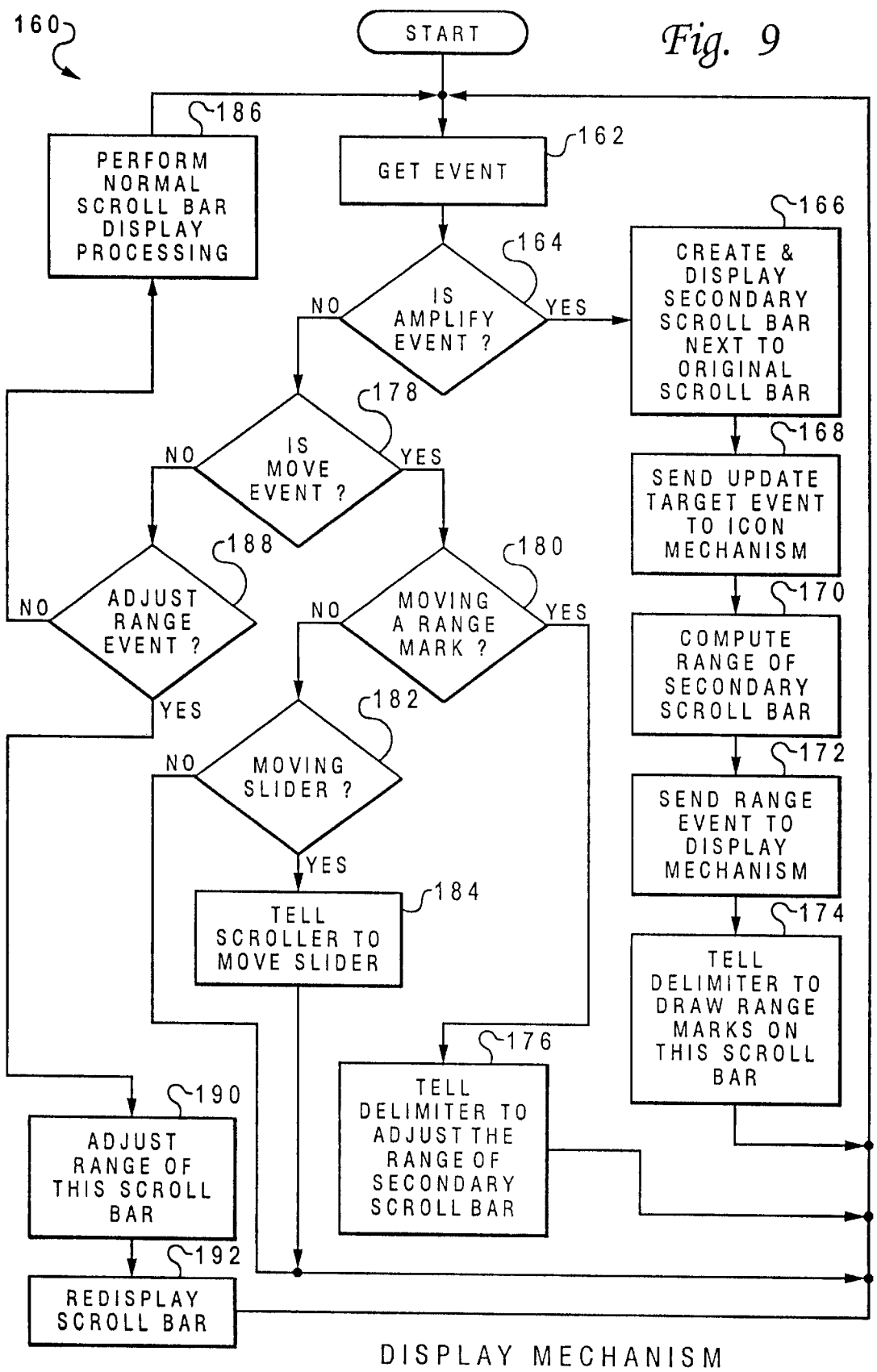
FIG. 9 illustrates a flow diagram that shows steps utilized to implement a display mechanism, according to the preferred embodiment.

FIG. 9 illustrates a flow diagram 160 that shows steps utilized to implement a display mechanism, according to the preferred embodiment of the present invention. FIG. 9 depicts steps implementing the icon mechanism depicted in FIG. 7. The display mechanism displays a secondary scroll bar within the graphical user interface in response to a selection of the icon mechanism by a user, such that the secondary scroll bar allows a user to scroll through a narrowly defined region of a viewable object. As depicted at block 162, a graphical user interface event is triggered. As illustrated at block 164, a test is performed to determine if the graphical user event that was performed, as described at block 162, was, in fact, an amplify event. If the event triggered is an amplify event, then, as depicted at block 166, a secondary scroll bar is created and displayed next to an original scroll bar.

As depicted at block 168, an update target event is sent to the icon mechanism. As illustrated at block 170, a searchable range of the viewable object or document covered by the secondary scroll bar is computed. Next, as indicated at block 172, a range event that includes data indicative of the searchable range of the viewable object is sent to the display mechanism of the newly created scroll bar. Next as depicted at block 174, the delimiter described earlier is given instructions to draw range marks on the original or previously displayed scroll bar. The range marks (i.e., delimiter marks) indicate a searchable range of the viewable object by the secondary scroll bar. Thereafter, the process can end here or begin again.

As depicted at block 162, the display mechanism waits for a graphical user interface event to occur. The process described in FIG. 9 will not continue unless a graphical user event occurs. When the graphical user event occurs, a determination is then made, as indicated at block 178, as to whether or not a movement event has occurred. A movement event is a graphical user interface event in which an icon or object displayed within the viewable object such as a slider or delimiter marks is moved to a different location within the graphical user interface. If a movement event has occurred, then, as depicted at block 180, a test is performed to determine whether a range mark has been moved. If the test determines that a range mark has been moved, then, as illustrated at block 176, the delimiter is instructed to adjust the range of the secondary scroll bar in accordance with the movement of the range mark. For example, dotted lines 89 and 91 depicted in FIG. 5 are range marks. Moving dotted lines 89 or 91 can alter a searchable range of the viewable object. If, on the other hand, a determination is made that the range marks have not been moved, then, as depicted at block 182, a test is performed to determine whether or not the slider has been moved. If the slider has been moved, then, as depicted at block 184, the scroll mechanism is instructed to move the slider.

If, as depicted at block 178, a determination is performed resulting in an indication that a movement even has not occurred, then, as illustrated at block 188, a test is performed to determine whether or not an "adjust range" event has occurred. An "adjust range" event is a graphical user interface event in which the searchable range of the viewable object by the secondary scroll bar is to be adjusted. For example, if the searchable range of the secondary scroll bar is 10% of the window area covered by the original or previously displayed scroll bar, the range can be adjusted above or below 10%, depending upon the desires of the user. Thus, if it is determined, as illustrated at block 188, that an "adjust range" event has occurred, then, as depicted at block 190, the range is adjusted. Next as described at block 192, the secondary scroll bar is redisplayed according to the newly adjusted range. If, however, a determination is made that an "adjust range" event has not occurred, then, as depicted at block 186, normal scroll bar display processing operations occur.

Figure 10:
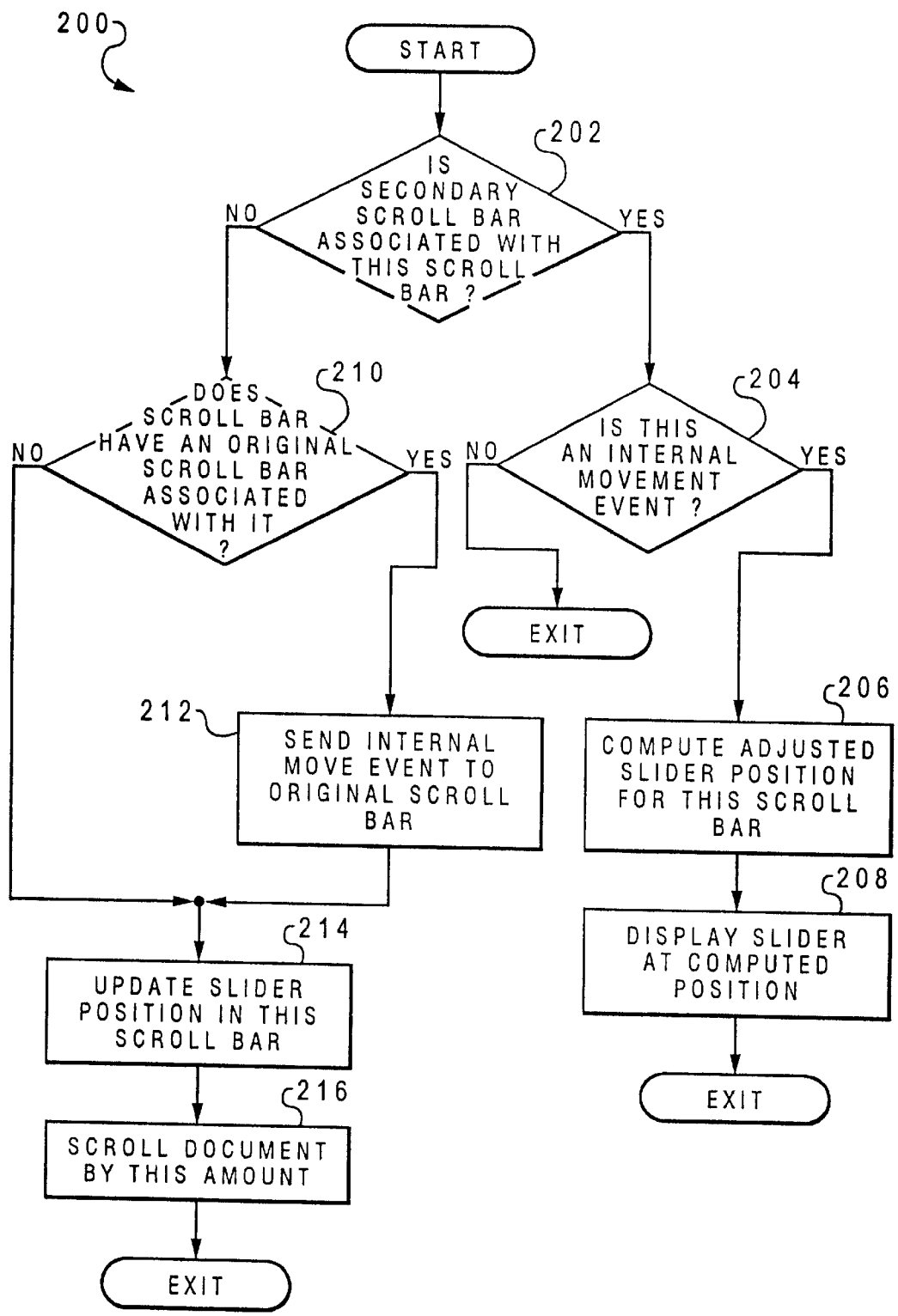
FIG. 10 depicts a flow diagram that shows steps utilized to implement a scroll mechanism, according to the preferred embodiment.

FIG. 10 depicts a flow diagram 200 that shows steps utilized to implement a scroll mechanism, according to the preferred embodiment. The scroll mechanism is a component of the system depicted in FIG. 7 that scrolls through a narrowly defined region of a viewable object, in response to a user input within a secondary scroll bar. As depicted at block 202, a test is performed to determine if a scroll bar in which a slider is moved has a secondary scroll bar associated with the scroll bar in which the slider is moved. If it is determined that a scroll bar in which a slider is moved has a secondary scroll bar associated with the scroll bar in which the slider is moved, then, as illustrated at block 204, a test is performed to determine whether or not an internal movement event has occurred.

An internal movement event is an event in which a scroll mechanism (i.e., also referred to as a "scroller") is moved automatically by the graphical user interface, without user input. In other words, when a user drags a slider located within the secondary scroll bar, the slider located in the original or previously displayed scroll bar is dragged by an amount corresponding to movement within the overall viewable object. If it is determined that an internal movement has not occurred, then the process terminates. Thus, the user is not allowed to move the original slider located in the original scroll bar while the secondary scroll bar is active. However, if it is determined that an internal movement event has occurred, then, as depicted at block 206, an adjusted slider position for the slider located in the original scroll bar is computed. This adjusted slider position corresponds to a relative position of the secondary scroll bar slider in relation to the overall viewable object. Next, as depicted at block 208, the slider located within the original or previously displayed scroll bar is displayed at the computed position. Thereafter, the process terminates.

If it is determined, as depicted at block 202, that a scroll bar in which a slider is moved or dragged does not have a secondary scroll bar associated with it, then, as described at block 210, an additional test is performed to determine if the scroll bar in which the slider is moved or dragged has an original scroll bar associated with it. If so, then, as depicted at block 212, an internal movement event is triggered and sent to the original scroll bar. If not, then, as illustrated at block 214, or following completion of activity described at block 212, the slider position is updated within the secondary scroll bar. Next, as illustrated at block 216, the viewable object or document is scrolled by an amount corresponding to the updated slider position. Thereafter, the process terminates.

Figure 11A:
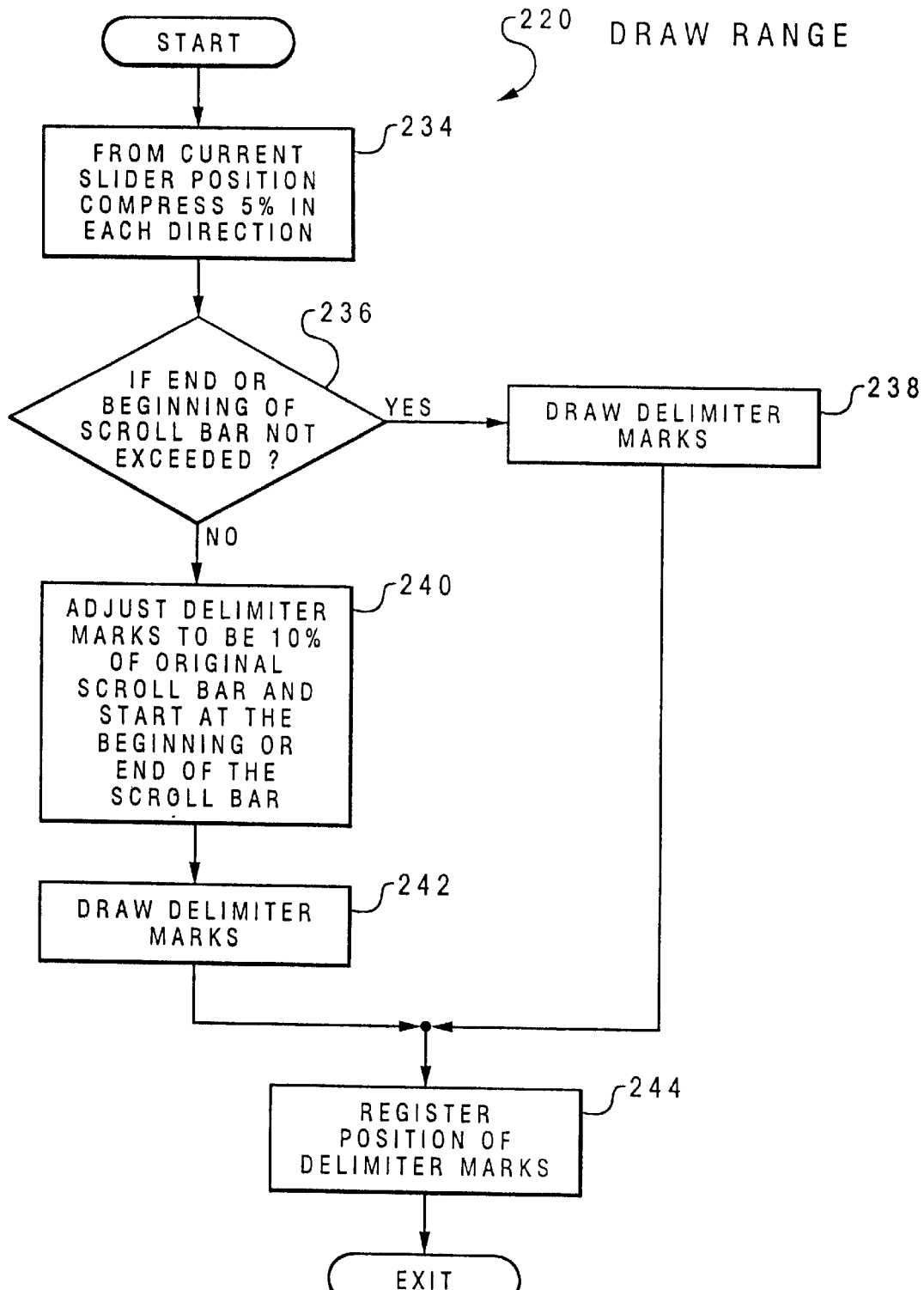
FIG. 11 illustrates flow diagrams depicting steps utilized to implement a delimiter component, according to the preferred embodiment.
Figure 11B:
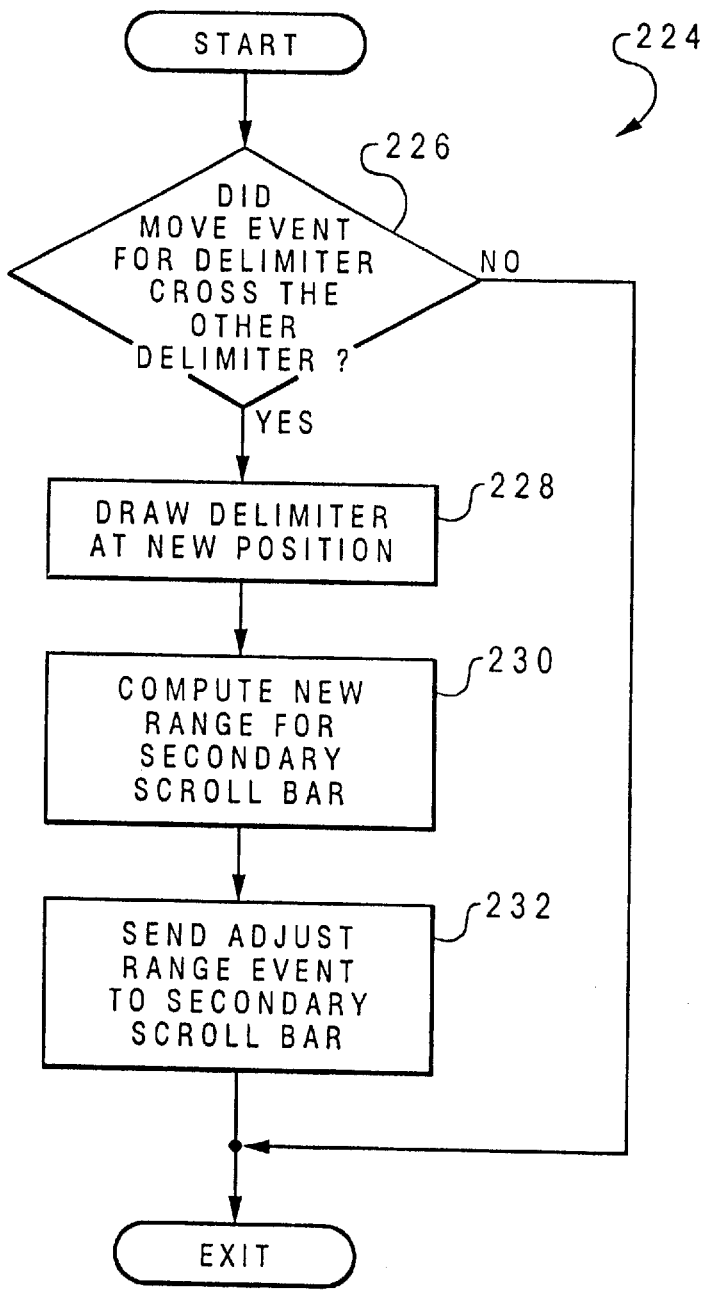

FIG. 11 illustrates flow diagrams depicting steps utilized to implement a delimiter, according to the preferred embodiment. The delimiter provides delimiter marks indicative of a searchable range of the viewable object by the secondary scroll bar. Flow diagram 220 depicts steps utilized to implement a "draw range" function of the delimiter depicted in FIG. 7. As depicted at block 234, the current slider position is compressed 5% in each direction. As illustrated at block 236, a test is performed to determine if the end or beginning of the original scroll bar has been exceeded. If the end or beginning of the original scroll bar has not been exceeded, then, as depicted at block 238, delimiter marks are drawn within the original, previously displayed scroll bar. Thereafter, the activity depicted in block 244 is implemented. If the end or beginning of the original scroll bar has been exceeded, then, as depicted at block 240, the delimiter marks are adjusted to correspond to a 10% range of the original scroll bar.

Also, as depicted at block 240, the secondary scroll is adjusted so that a search utilizing the secondary scroll bar begins toward the beginning or ending regions of the secondary scroll bar, according to placement of the original slider within the original or previously displayed scroll bar. For example, if the original slider was located within the original scroll bar in a region that corresponds to the upper portion (i.e., beginning region) of the secondary scroll bar, the secondary scroll bar will be adjusted so that a search utilizing the secondary scroll bar begins in the beginning region of the secondary scroll bar. Likewise, if the original slider was located within the original scroll bar in a region that corresponds to the lower portion (i.e., ending region) of the secondary scroll bar, the secondary scroll bar will be adjusted so that a search utilizing the secondary scroll bar begins in the ending region of the secondary scroll bar. Thereafter, as illustrated at block 242, the delimiter marks are drawn. As illustrated at block 244, the current position of the delimiter markers is recorded. The "draw range" function of the delimiter then terminates.

Flow diagram 224 depicts steps utilized to implement an "adjust range" function of the delimiter. As depicted at block 226, a test is performed to determine if a movement event for the delimiter has occurred in which the range marks overlap one another. If it is determined that the range marks overlap one another, then, as depicted at block 228, the range or delimiter marks are drawn at a new position. Next, as illustrated at block 230, a new range for the secondary scroll bar is computed. Thereafter, as depicted at block 232 an adjust range event is sent to the secondary scroll bar. Thereafter, the "adjust range" function of the delimiter terminates.

The embodiments and examples set forth herein are presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. An apparatus for use with viewable objects in a data-processing system, comprising:

a secondary scroll bar utilized in association with a primary scroll bar displayed within a graphical user interface, said primary scroll bar having a specified granularity, wherein said secondary scroll bar increases granularity to a finer granularity than said specified granularity while scrolling through a viewable object in response to an activation of said secondary scroll bar;

an icon located within said graphical user interface, wherein said icon provides an increased granularity scrolling mechanism in response to a user selection thereof;

a display mechanism that displays said secondary scroll bar within said graphical user interface in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon; and a scroll mechanism which scrolls through said narrowly defined region of said viewable object, in response to a user input within said secondary scroll bar.

2. The apparatus of claim 1 wherein said delimiter further comprises at least two delimiter marks, wherein said at least two delimiter marks correspond to a boundary of a searchable range of said viewable object by said secondary scroll bar.

3. An apparatus for use with viewable objects in a data-processing system, comprising:

a secondary scroll bar that scrolls in a first axis and which is utilized in association with a primary scroll bar that also scrolls in said first axis, said secondary scroll bar and said primary scroll bar displayed within a graphical user interface, wherein said primary scroll bar has a specified granularity and said secondary scroll bar increases granularity to a finer granularity than said specified granularity while scrolling through a viewable object in response to an activation of said secondary scroll bar;

an icon located within said graphical user interface, wherein said icon provides an increased granularity scrolling mechanism in response to a user selection thereof;

a display mechanism that displays said secondary scroll bar within said graphical user interface in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon; and a scroll mechanism which scrolls through said narrowly defined region of said viewable object, in response to a user input within said secondary scroll bar.

4. The apparatus of claim 3 wherein said delimiter further comprises at least two delimiter marks, wherein said at least two delimiter marks correspond to a boundary of a searchable range of said viewable object by said secondary scroll bar.

5. A program product residing in computer memory in a computer system for use with viewable objects, said program product comprising:

a secondary scroll bar utilized in association with a primary scroll bar displayed within a graphical user interface, said primary scroll bar having a specified granularity, wherein said secondary scroll bar increases granularity to a finer granularity than said specified granularity while scrolling through a viewable object in response to an activation of said secondary scroll bar;

an icon located within said graphical user interface wherein said icon provides an increased granularity scrolling mechanism in response to a user selection thereof;

a display mechanism that displays said secondary scroll bar within said graphical user interface in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon;

a scroll mechanism which scrolls through said narrowly defined region of said viewable object, in response to a user input within said secondary scroll bar; and signal-bearing means bearing said secondary scroll bar, said icon, said display mechanism, said delimiter, and said scroll mechanism.

6. The program product of claim 5 wherein said delimiter further comprises at least two delimiter marks, such that said at least two delimiter marks correspond to a boundary of a searchable range of said viewable object by said secondary scroll bar.

7. The program product of claim 6 wherein:
said signal-bearing means further comprises transmission media.

8. The program product of claim 6 wherein:
said signal-bearing means further comprises recordable media.

9. A program product residing in computer memory in a computer system for use with viewable objects, said program product comprising:

a secondary scroll bar that scrolls in a first axis and which is utilized in association with a primary scroll bar that also scrolls in said first axis, said secondary scroll bar and said primary scroll bar displayed within a graphical user interface, wherein said primary scroll bar has a specified granularity and said secondary scroll bar increases granularity to a finer granularity than said specified granularity while scrolling through a viewable object in response to an activation of said secondary scroll bar;

an icon located within said graphical user interface wherein said icon provides an increased granularity scrolling mechanism in response to a user selection thereof, a display mechanism that displays said secondary scroll bar within said graphical user interface in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon, a scroll mechanism which scrolls through said narrowly defined region of said viewable object, in response to a user input within said secondary scroll bar; and signal-bearing means bearing said secondary scroll bar, said icon, said display mechanism, said delimiter, and said scroll mechanism.

10. The program product of claim 9 wherein said delimiter further comprises at least two delimiter marks, such that said at least two delimiter marks correspond to a boundary of a searchable range of said viewable object by said secondary scroll bar.

11. The program product of claim 10 wherein:
said signal-bearing means further comprises transmission media.

12. The program product of claim 10 wherein:
said signal-bearing means further comprises recordable media.

13. A method for increasing granularity while scrolling through a viewable object displayed within an interface having a primary scroll bar, comprising the steps of:

displaying an icon within said interface, wherein said icon provides an increased granularity scrolling mechanism in response to a user selection thereof;

displaying a secondary scroll bar within said interface, in response to a selection of said icon by a user, wherein said secondary scroll bar allows a user to scroll through a narrowly defined region of said viewable object;

displaying within said primary scroll bar, delimiter marks indicative of a searchable range of said viewable object by said secondary scroll bar, in response to said selection of said icon; and scrolling through said narrowly defined region of said viewable object in response to a user input within said secondary scroll bar.

14. The method of claim 13 further comprising the step of modifying said delimiter to further comprise at least two delimiter marks, wherein said at least two delimiter marks correspond to a boundary of a searchable range of said viewable object by said secondary scroll bar.

15. The method of claim 14 further comprising the step of modifying said secondary scroll bar to further comprise:

a secondary scroll bar utilized in association with a primary scroll bar displayed within said interface, said primary scroll bar having a specified granularity, wherein said secondary scroll bar increases granularity to a finer granularity than said specified granularity while scrolling through a viewable object in response to an activation of said secondary scroll bar.

16. The method of claim 14 further comprising the step of modifying said secondary scroll bar to further comprise:

a secondary scroll bar that scrolls in a first axis and which is utilized in association with a primary scroll bar that also scrolls in said first axis, said secondary scroll bar and said primary scroll bar displayed within said interface, wherein said primary scroll bar has a specified granularity and said secondary scroll bar increases granularity to a finer granularity than said specified granularity while scrolling through a viewable object in response to an activation of said secondary scroll bar.

17. An apparatus for use with viewable objects in a data-processing system, comprising:

a secondary scroll bar utilized in association with a primary scroll bar displayed within a graphical user interface, said primary scroll bar having a specified granularity, wherein said secondary scroll bar increases granularity to a finer granularity than said specified granularity while scrolling through a viewable object in response to an activation of said secondary scroll bar;

an icon located within said graphical user interface wherein said icon provides an increased granularity scrolling mechanism in response to a user selection thereof;

a display mechanism that displays said secondary scroll bar within said graphical user interface in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon; and a scroll mechanism which scrolls through said narrowly defined region of said viewable object, in response to a user input within said secondary scroll bar; and wherein said delimiter further comprises at least two delimiter marks, such that said at least two delimiter marks correspond to a boundary of a searchable range of said viewable object by said secondary scroll bar.

18. An apparatus for use with viewable objects in a data-processing system, comprising:

a secondary scroll bar that scrolls in a first axis and which is utilized in association with a primary scroll bar that also scrolls in said first axis, said secondary scroll bar and said primary scroll bar displayed within a graphical user interface, wherein said primary scroll bar has a specified granularity and said secondary scroll bar increases granularity to a finer granularity than said specified granularity while scrolling through a viewable object in response to an activation of said secondary scroll bar;

an icon located within said graphical user interface, wherein said icon provides an increased granularity scrolling mechanism in response to a user selection thereof;

a display mechanism that displays said secondary scroll bar within said graphical user interface, in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon; and a scroll mechanism which scrolls through said narrowly defined region of said viewable object, in response to a user input within said secondary scroll bar; and wherein said delimiter further comprises at least two delimiter marks, wherein said at least two delimiter marks correspond to a boundary of a searchable range of said viewable object by said secondary scroll bar.

19. A program product residing in computer memory in a computer system for use with viewable objects, said program product comprising:

a secondary scroll bar utilized in association with a primary scroll bar displayed within a graphical user interface, said primary scroll bar having a specified granularity, wherein said secondary scroll bar increases granularity to a finer granularity than said specified granularity while scrolling through a viewable object in response to an activation of said secondary scroll bar;

an icon located within said graphical user interface wherein said icon provides an increased granularity scrolling mechanism in response to a user selection thereof;

a display mechanism that displays said secondary scroll bar within said graphical user interface in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon, such that said delimeter comprises at least two delimiter marks, wherein said at least two delimiter marks correspond to a boundary of a searchable range of said viewable object by said secondary scroll bar;

a scroll mechanism which scrolls through said narrowly defined region of said viewable object, in response to a user input within said secondary scroll bar;

signal-bearing means bearing said secondary scroll bar, said icon, said display mechanism, said delimiter, and said scroll mechanism.

20. The program product of claim 19 wherein said signal-bearing means further comprises transmission media.

21. The program product of claim 19 wherein said signal-bearing means further comprises recordable media.

22. A program product residing in computer memory in a computer system for use with viewable objects, said program product comprising:

a secondary scroll bar that scrolls in a first axis and which is utilized in association with a primary scroll bar that also scrolls in said first axis, said secondary scroll bar and said primary scroll bar displayed within a graphical user interface, wherein said primary scroll bar has a specified granularity and said secondary scroll bar increases granularity to a finer granularity than said specified granularity while scrolling through a viewable object in response to an activation of said secondary scroll bar;

an icon located within said graphical user interface wherein said icon provides an increased granularity scrolling mechanism in response to a user selection thereof;

a display mechanism that displays said secondary scroll bar within said graphical user interface in response to a selection of said icon by a user, wherein said secondary scroll bar allows a user to scroll through a narrowly defined region of said viewable object;

a delimiter that provides delimiter marks indicative of a searchable range of said viewable object by said secondary scroll bar, wherein said delimiter marks are displayed within said primary scroll bar, in response to said selection of said icon, said delimeter comprising at least two delimiter marks, such that said at least two delimiter marks correspond to a boundary of a searchable range of said viewable object by said secondary scroll bar;

a scroll mechanism which scrolls through said narrowly defined region of said viewable object, in response to a user input within said secondary scroll bar; and signal-bearing means bearing said secondary scroll bar, said icon, said display mechanism, said delimiter, and said scroll mechanism.

23. The program product of claim 22 wherein said signal-bearing means further comprises transmission media.

24. The program product of claim 22 wherein said signal-bearing means further comprises recordable media.

* * * * *